(12) United States Patent
Diethorn et al.

(10) Patent No.: US 8,218,738 B2
(45) Date of Patent: Jul. 10, 2012

(54) FACILITIES MANAGEMENT SYSTEM

(75) Inventors: Eric John Diethorn, Long Valley, NJ (US); Jon Louis Bentley, New Providence, NJ (US); Anjur Sundaresan Krishnakumar, Rocky Hill, NJ (US); David Mandel Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1316 days.

(21) Appl. No.: 11/866,174

(22) Filed: Oct. 2, 2007

(65) Prior Publication Data

US 2009/0086940 A1   Apr. 2, 2009

(51) Int. Cl.
*H04M 11/00* (2006.01)

(52) U.S. Cl. ............................. 379/102.05; 379/102.07

(58) Field of Classification Search . 379/102.01–102.07
See application file for complete search history.

(56) References Cited

U.S. PATENT DOCUMENTS

| | | | | |
|---|---|---|---|---|
| 4,021,615 A | * | 5/1977 | James et al. | 379/102.03 |
| 5,318,224 A | * | 6/1994 | Darby et al. | 236/47 |
| 5,838,776 A | * | 11/1998 | Adkins et al. | 379/102.05 |
| 6,260,765 B1 | * | 7/2001 | Natale et al. | 236/47 |
| 6,380,852 B1 | * | 4/2002 | Hartman et al. | 340/521 |
| 6,724,873 B2 | * | 4/2004 | Senna Da Silva | 379/102.01 |
| 6,854,660 B2 | * | 2/2005 | Yoon et al. | 236/51 |
| 6,970,539 B2 | * | 11/2005 | Yamamoto et al. | 379/102.05 |
| 7,058,429 B2 | * | 6/2006 | Fujito et al. | 455/567 |
| 7,091,853 B2 | * | 8/2006 | Pfleging et al. | 340/539.16 |
| 7,253,732 B2 | | 8/2007 | Osann, Jr. | |
| 2003/0163222 A1 | * | 8/2003 | Choi | 700/277 |

* cited by examiner

*Primary Examiner* — Simon Sing
(74) *Attorney, Agent, or Firm* — Maldjian Law Group LLC; John P. Maldjian, Esq.; Alexander D. Walter, Esq.

(57) ABSTRACT

A technique is disclosed that enables the managing of environmental conditions within an enterprise workplace and, in doing so, provides an improvement in facilities cost management over some techniques in the prior art. A data-processing system such as a private-branch exchange monitors the workplace by using one or more telephones, or other "telecommunications endpoints" to which the exchange is connected, in the workplace area. The exchange determines whether people are present in the workplace area by monitoring which endpoints are in use. Additionally, the exchange monitors the sounds that are received by the microphones of the endpoints. Based on knowing which endpoints are in use, the exchange generates control signals for the purpose of controlling one or more environmental conditions such as temperature, lighting, and so forth. In some embodiments of the present invention, the exchange examines the audio content of the received signals and bases the control signals on the audio content analyzed.

20 Claims, 4 Drawing Sheets

FACILITIES MANAGEMENT SYSTEM

FIELD OF THE INVENTION

The present invention relates to telecommunications in general, and, more particularly, to a method of managing an enterprise's non-telecommunications facilities, such as environmental control, via the telecommunications infrastructure that is present.

BACKGROUND OF THE INVENTION

An enterprise that desires its employees to be productive has to enable effective communications by providing some type of telecommunications infrastructure. For example, the enterprise can use call-handling equipment such as private branch exchanges to enable employees to communicate conveniently with one another, as well as with people external to the enterprise. A private branch exchange, in particular, is capable of routing incoming calls from a telecommunications network, such as the Public Switched Telephone Network, via one or more transmission lines to any of the on-premises telephones that exist within the enterprise. Similarly, the private branch exchange is also capable of handling outgoing calls from any of the on-premises telephones to the telecommunications network.

Additionally, the private branch exchange is capable of providing telecommunications features that enable the forwarding of calls, the transferring of calls, conferencing, and so forth. Typically, each user of an on-premises telephone can create a customized profile that is stored at the private branch exchange and indicates to the exchange how to present information to and respond to signals from a telephone. In short, a private branch exchange—or other types of call-handling equipment, for that matter—provides a powerful tool with which employees are able to communicate with one another and accomplish work in the process.

Meanwhile, the same enterprise that desires productive employees has to provide comfortable working conditions by regulating environmental conditions at acceptable levels, conditions such as temperature and lighting. Of course, from a facilities cost perspective, it can be expensive to maintain such a workplace. Particular costs include those related to providing environmental control, but also other costs such as ensuring employee safety and enforcing building security. Some costs are incurred during normal working hours and some are incurred after hours.

Often an enterprise has to consider tradeoffs between saving facilities costs and adequately providing for its employees. For example, an enterprise might want to manage its energy costs during the winter by lowering the indoor air temperature by as much as possible and as often as possible. Of course, lowering the temperature too much causes employees to experience discomfort.

Therefore, an effective technique is needed to manage facilities costs, without some of the disadvantages in the prior art.

SUMMARY OF THE INVENTION

The present invention enables the managing of environmental conditions within an enterprise workplace and, in doing so, provides an improvement in facilities cost management over some techniques in the prior art. In accordance with the illustrative embodiment of the present invention, a data-processing system such as a private-branch exchange monitors the workplace by using one or more telephones, or other "telecommunications endpoints" to which the exchange is connected, in the workplace area. The exchange determines whether people are present in the workplace area by monitoring which endpoints are in use. Additionally, the exchange monitors the sounds that are received by the microphones of the endpoints. Based on knowing which endpoints are in use, the exchange generates control signals for the purpose of controlling one or more environmental conditions such as temperature, lighting, and so forth. In some embodiments of the present invention, the exchange examines the audio content of the received signals and bases the control signals on the audio content analyzed.

The advantage that is gained in the illustrative embodiment over some techniques in the prior art is accomplished by leveraging much of the existing telecommunications infrastructure within an enterprise. With some techniques in the prior art, improving the management of environmental conditions and facilities costs can require a costly retrofit of an office building with an improved sensor network. In contrast, the management system in the illustrative embodiment is able to leverage the use of the existing infrastructure by using the telecommunications endpoints that are already present, typically in each and every room, in order to manage the non-telecommunications facilities and costs.

As an example of how the illustrative embodiment manages a building, suppose first that the building is kept at a slightly cooler temperature at night than during the workday. At the start of the workday, a first person arrives and goes to use his telephone to call a second person across the building. The private branch exchange of the illustrative embodiment senses the "off-hook" condition of the first person's phone and, when the second person answers, the off-hook condition at the second phone. The exchange infers from the off-hook signals that people must be present in the two offices; it know then to generate a control signal to raise the temperature at or near the first person's office and additionally near the second person's office.

Continuing with the example, in some embodiments the exchange performs a keyword analysis of the audio content of the conversation between the two people. The first person comments in passing, "Gee, it's too cold in this office." In monitoring the audio content being uttered by the first person, the private branch exchange discerns the reference to the office being "too cold" and generates a control signal to raise the air temperature in her office. Additionally, if the second person comments that his room "too hot," the exchange discerns the content and, as a result, generates a control signal to lower the air temperature in his office.

Finally, at the end of the normally-scheduled workday in the example, if a predetermined amount of time elapses without the exchange having detected any audio signals or endpoint usage, which might suggest that the employees have left for the day, the exchange can then generate a control signal to apply the nighttime settings to the rooms of one or both of the people.

As suggested by the example above, the illustrative embodiment of the present invention features the management of environmental conditions. However, it will be clear to those skilled in the art, after reading this specification, how to make and use alternative embodiments of the present invention in which the data-processing system is able to manage other types of facilities, such as building security and employee safety systems. It will also be clear to those skilled in the art, after reading this specification, that other techniques are possible that involve using signals from one or more telecommunications endpoints, in order to control a building.

The illustrative embodiment of the present invention comprises: receiving, at a data-processing system, a first in-use signal from a first telecommunications endpoint that is part of a plurality of endpoints that are situated within a first geographic area and that are served by the data-processing system, the first in-use signal indicating that a user is using the first telecommunications endpoint, the data-processing system being capable of setting up a telephone call between the first telecommunications endpoint and a second telecommunications endpoint; and generating a first control signal for changing a first environmental condition, the first control signal being based on the receiving of the first in-use signal.

DETAILED DESCRIPTION

Figure 1:
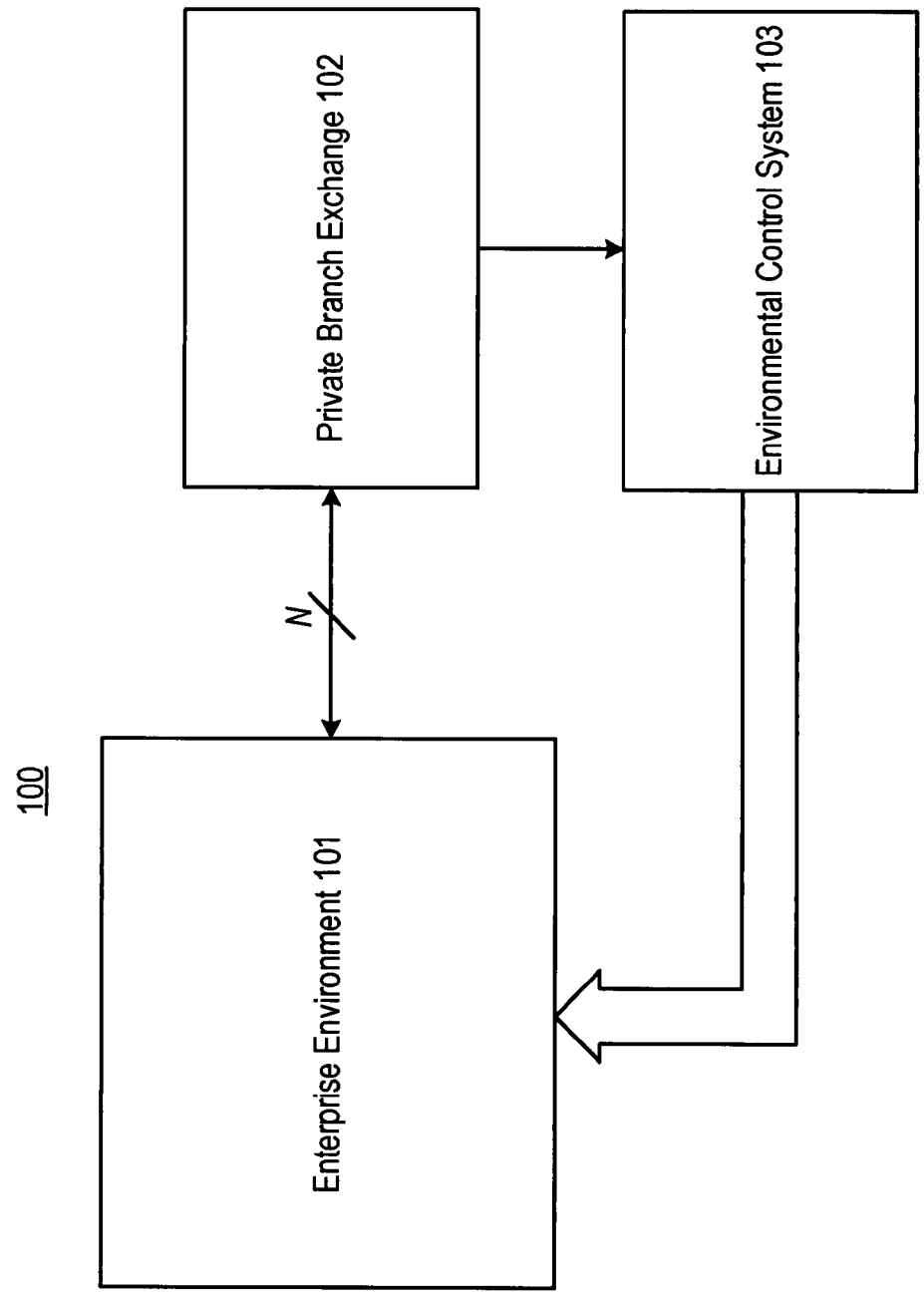
FIG. 1 depicts schematic diagram of the salient components of telecommunications system 100 in accordance with the illustrative embodiment of the present invention.

FIG. 1 depicts schematic diagram of the salient components of telecommunications system 100 in accordance with the illustrative embodiment of the present invention. System 100 comprises enterprise environment 101, private branch exchange 102, and environmental control system 103, interrelated as shown.

Enterprise environment 101 represents the telecommunications facilities at a particular location of an enterprise, such as an office complex of a corporation, a school building, a hospital, a church, and so forth. Environment 101 comprises a plurality of N telecommunications endpoints that are capable of originating, receiving, or otherwise handling telephone calls for their users. Each endpoint within environment 101 is connected to private branch exchange 102 for the purpose of enabling telephone calls and for carrying out the techniques of the illustrative embodiment. Environment 101 is described below and with respect to FIG. 2.

The telecommunications infrastructure that is present within environment 101 provides the connectivity between the endpoints and private branch exchange 102. The infrastructure comprises one or more telecommunications networks, including a local area network (LAN), along with switches, routers, and other networking equipment. In some embodiments, the infrastructure comprises the Internet or possibly other Internet Protocol-based networks. The endpoints within environment 101, in some embodiments, might be connected to private branch exchange 102 via the Public Switched Telephone Network, which is a complex of telecommunications equipment that is owned and operated by different entities throughout the World. As those who are skilled in the art will appreciate, the endpoints within environment 101 might be interconnected with private branch exchange 102 via other combinations of network infrastructure.

With respect to the non-telecommunications facilities that affect enterprise environment 101, environmental facilities are used to control the enterprise's environmental conditions. Such environmental conditions include, but are not limited to, temperature, humidity, lighting, air quality, and so forth. These environmental conditions are controlled by environmental control system 103.

Private branch exchange 102 is a data-processing system, such as a server or switch, which enables the users of multiple endpoints to communicate with other endpoint users, in well-known fashion. Exchange 102 receives audio and control signals from endpoints that are involved in one or more telephone calls, generates output signals, and applies those generated signals to selected phone calls or endpoints, in accordance with the illustrative embodiment of the present invention. Exchange 102 is described in detail below and with respect to FIG. 3.

In accordance with the illustrative embodiment, the techniques of the illustrative embodiment are implemented at a private branch exchange. However, it will be clear to those skilled in the art, after reading this specification, how to make and use alternative embodiments of the present invention, in which the techniques are implemented at a data-processing system that comprises functionality other than that of a private branch exchange, such as a teleconference bridge.

Environmental control system 103 comprises infrastructure such as heating, ventilation, and air-conditioning units, which are used to provide environmental conditions that make the enterprise environment suitable for occupancy and use by its employees. System 103 receives control signals from private branch exchange 102 and applies those signals for controlling one or more environmental conditions (e.g., temperature, lighting, etc.), in accordance with the illustrative embodiment of the present invention.

Figure 2:
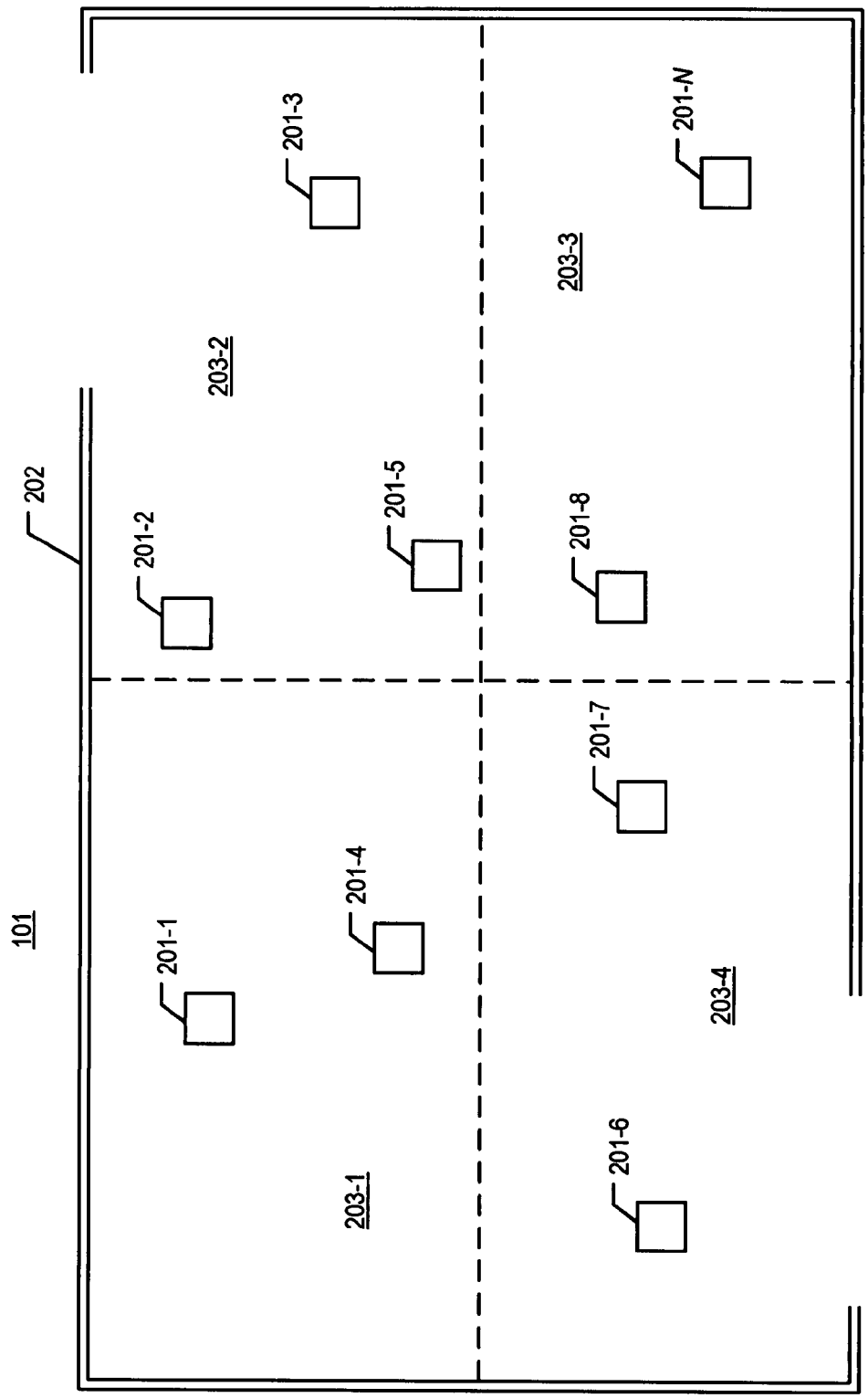
FIG. 2 depicts a diagram of the salient components of enterprise environment 101 within system 100.

FIG. 2 depicts a diagram of the salient components of enterprise environment 101, in accordance with the illustrative embodiment of the present invention. In particular, FIG. 2 depicts an overhead view of an office workplace, in which many people are situated within the office space and, as office workers, are also users of telecommunications endpoints. Depicted telecommunications endpoints 201-1 through 201-N can be situated on a desk within an employee's office or cubicle, in a conference room, or in a common area such as a pantry, copy room, or hallway wall. Endpoints 201-1 through 201-N are connected to private branch exchange 102 in well-known fashion.

For reasons of clarity, the office space depicted in FIG. 2 is shown as a single space, enclosed by wall 202, with no additional wall or partitions separating the endpoints from one another. However, it will be clear to those skilled in the art, after reading this specification, how to make and use alternative embodiments of the present invention, in which there is a different partitioning between two or more of the endpoints than depicted. For example, the endpoints might be in rooms separated by walls, in cubicles with half-wall partitions, or arranged in some combination thereof. Additionally, two or more endpoints might be collocated within the same room or cubicle.

Furthermore, although FIG. 2 depicts a total of nine telecommunications endpoints, it will be clear to those skilled in the art, after reading this specification, how to make and use alternative embodiments with a different number of endpoints.

Telecommunications endpoint 201-n, where n has a value between 1 and N, inclusive, is capable of originating, receiving, or otherwise handling a telephone call for its user, in well-known fashion. Endpoint 201-n is able to call, or to be called by, another endpoint. In order for its user to participate in a telephone call, endpoint 201-n is able to dial a telephone number that private branch exchange 102 understands; the exchange subsequently routes the corresponding call to the appropriate endpoint being called. Endpoint 201-n can be an analog telephone, an ISDN terminal, a softphone, an Internet-Protocol phone, a cellular phone, a cordless phone, a PBX deskset, a conference phone or "speakerphone", or some other type of telecommunications appliance.

Enterprise environment 101 as depicted is divided into four environmental control areas, zones 203-1 through 203-4. The environmental conditions that apply within each zone are controllable on a zone-by-zone basis. For example, the conditions that apply to the office spaces situated within zone 203-1 can be different from those that apply to zone 203-2, which can be different from those that apply to zones 203-3 and 203-4. Although four zones are depicted in FIG. 2, it will be clear to those skilled in the art, after reading this specification, how to make and use alternative embodiments of the present invention in which there is a different number of zones within the enterprise area being controlled.

Figure 3:
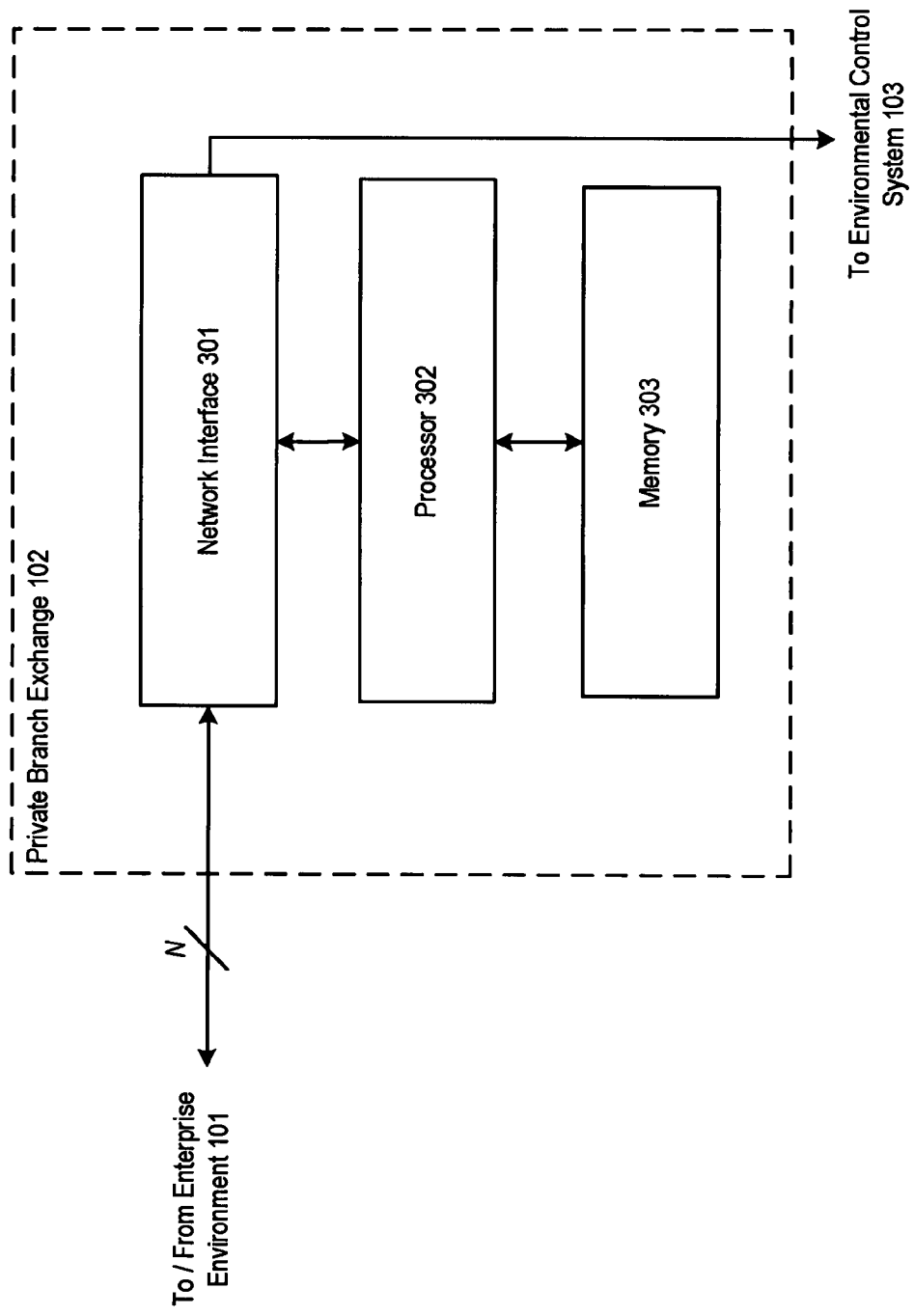
FIG. 3 depicts a block diagram of the salient components of private branch exchange 102 within system 100.

FIG. 3 depicts a block diagram of the salient components of private branch exchange 102, in accordance with the illustrative embodiment of the present invention. Exchange 102 comprises network interface 301, processor 302, and memory 303, interconnected as shown. Exchange 102 is capable of performing the tasks described below and with respect to FIG. 4.

Network interface 301 comprises the circuitry that enables exchange 102 to receive signals from and transmit signals to the endpoints within environment 101, in well-known fashion. In accordance with the illustrative embodiment, interface 301 receives and transmits audio signals that are represented in Internet Protocol packets, in well-known fashion. Additionally, interface 301 comprises the circuitry that enables exchange 102 to exchange signals with environmental control system 103, in accordance with the illustrative embodiment of the present invention. In accordance with the illustrative embodiment, interface 301 receives and transmits environmental control signals via the Building Automation and Control Networks (BACnet) protocol, as is known in the art. As those who are skilled in the art will appreciate, in some alternative embodiments interface 301 receives and transmits audio or control signals, or both, in a different format.

Processor 302 is a general-purpose processor that is capable of receiving information from network interface 301, of executing instructions stored in memory 303, of reading data from and writing data into memory 303, and of transmitting information to network interface 301. In some alternative embodiments of the present invention, processor 302 might be a special-purpose processor.

Memory 303 stores the instructions and data used by processor 302, in well-known fashion. Memory 303 might be any combination of dynamic random-access memory (RAM), flash memory, disk drive memory, and so forth.

In accordance with the illustrative embodiment, memory 303 stores a database that comprises information on where each endpoint is situated relative to other endpoints, what the relationship is between endpoints and zones, and so forth. In some alternative embodiments, the database is stored at another data-processing system, and exchange 102 is able to access the database through the other system.

Figure 4:
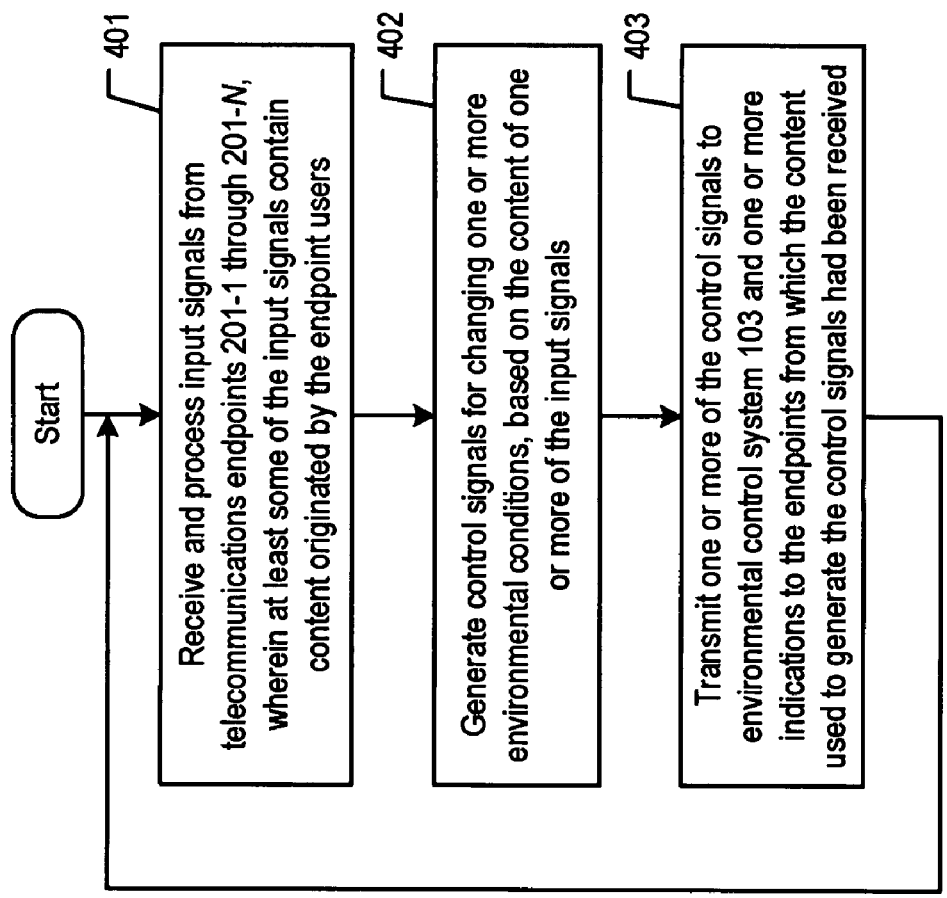
FIG. 4 depicts a flowchart of the salient tasks that are related to managing the environmental facilities within enterprise environment 101, in accordance with the illustrative embodiment of the present invention.

FIG. 4 depicts a flowchart of the salient tasks that are related to managing the environmental facilities within enterprise environment 101, in accordance with the illustrative embodiment of the present invention. As those who are skilled in the art will appreciate, some of the tasks that appear in the flowchart can be performed in parallel or in a different order than that depicted. Moreover, those who are skilled in the art will further appreciate that in some alternative embodiments of the present invention, only a subset of the depicted tasks are performed.

At task 401, private branch exchange 102 receives and processes one or more input signals from endpoints 201-1 through 201-N in well-known fashion. Exchange 102 receives, from endpoints 201-1 through 201-N, one or more signals that indicate whether each endpoint is in use. An endpoint is in use, for example, when its user is utilizing the endpoint to handle a telephone call, to retrieve voice mail, or to invoke some other feature that results in the signaling of exchange 102. The in-use signaling can come from endpoint 201-n in the form of an "off-hook" indication, dialed digits, or a packet message that indicates that the user is utilizing the endpoint. As those who are skilled in the art will appreciate, other signals from endpoint 201-n can be used to indicate that the endpoint is being used.

In accordance with the illustrative embodiment, at least some of the inputs signals that exchange 102 receives are audio signals, which contain content uttered by the endpoint users. As an example, exchange 102 can receive audio content when an endpoint user calls a designated telephone extension and speaks commands to affect one or more environmental conditions. Alternatively, exchange 102 can receive audio content that is part of the user's conversations with each other that occur via the private branch exchange.

In some alternative embodiments, exchange 102 monitors for the presence and utterances of people even when the endpoints are not in use. For example, through the microphone of each endpoint, exchange 102 can monitor for sounds, classify those sounds by probable source (e.g., human-made, etc.), and determine whether a human user is adjacent to an endpoint. As those who are skilled in the art will appreciate, exchange 102 can check for audio signals continuously, sporadically, or periodically.

In some other alternative embodiments, exchange 102 supports a digit-based interactive voice response (IVR) system, in which a user who wants to adjust an environmental condition (e.g., temperature, etc.) calls a telephone extension that routes to the IVR system via exchange 102. Exchange 102 then works through an "IVR tree," as is well-known in the art. For example, an IVR transaction between the system and a user who is feeling cold in her office in room 3D-203 might progress as follows:

System: "You are calling from room 3D-203. Press or say '1' if you are calling about that room"
User selects '1'
System: "Press or say '1' if your call is about your room climate. Press or say '2' to . . . "
User selects '1'
System: "Press or say '1' if it is too hot. Press or say '2' if it is too cold . . . "
User selects '2'
System: "Thank you. Your request is being processed."

As those who are skilled in the art will appreciate, other variations of an environment-controlling IVR system are possible. For example, in some embodiments, exchange 102 supports a voice-based IVR system, as is known in the art, in which the system is able to receive and process phrases such as "too hot", "too cool", "too humid", and so forth.

Exchange 102, in yet some other alternative embodiments, supports the reception and analysis of keywords, independently of an IVR system. For example, a user can call a telephone extension that routes through exchange 102 and, when the call is answered, can then speak commands such as "Building control. Too hot. Turn down heat." Alternatively, the user can speak such commands near her endpoint and without having called the extension first; exchange 102 can receive those commands via the endpoint's microphone and process them.

Exchange 102, in some additional alternative embodiments, is able to receive and process audio signals that represent the conversations that endpoint users have with each other when they use their endpoints during the course of a workday. A relatively simple form of processing involves the spotting of keywords, such as "too hot", "too cold", "stuffy", "in here", "in my room", and so forth. For example, at one point in the conversation between the two endpoint users, the user of endpoint 201-1 utters, "Gee, it's too cold in my room". Exchange 102 receives the audio signal from the user and recognizes "too cold" and "in my room". As a result, the exchange generates a controlling signal, as described below and with respect to task 402. In a more complex form of conversational analysis, in some embodiments exchange 102 analyzes ongoing conversations between users on their endpoints.

Private branch exchange 102 is able to discern the audio content of the received audio signals by using speech recognition techniques that are well-known in the art. For example, exchange 102 is able to correlate the received sounds—or lack thereof—with signal profiles stored in its database. In addition, although the examples above feature content without any command syntax, the users' utterances could be alternatively phrased as explicit commands (e.g., "raise the temperature," etc.) and recognized.

At task 402, exchange 102 generates, for a given environmental condition that is controllable by environmental control system 103, a controlling signal that specifies the value of the environmental condition, such as the temperature to take effect for a particular zone. As those who are skilled in the art will appreciate, other environmental conditions can be controlled as well, such as humidity, lighting, air quality, and so forth. The controlling signal is based on the content of the one or more input signals received from the endpoints. In some embodiments, the controlling signal might be based on one or more in-use signals. Exchange 102 generates a controlling signal for each environmental condition to be controlled.

For example, suppose that exchange 102 has already set up a telephone call between endpoints 201-1 and 201-8. At one point in the conversation between the two endpoint users, the user of endpoint 201-1 utters, "Gee, it's too cold in this room." In accordance with the illustrative embodiment, private branch exchange 102 discerns in the audio content the user's reference to the cold temperature and, as a result, generates a control signal to raise the air temperature. In some embodiments, exchange 102 specifies the particular zone of the user, in this case zone 203-1, as part of the generated message.

As a second example, the same scenario applies, except that the user of endpoint 201-8 utters, "Really? Well, it think it's too hot in my office, and the lighting is too bright in here," in response to the first user's comment. In accordance with the illustrative embodiment, private branch exchange 102 discerns in the audio content the user's reference to the hot temperature and bright lighting and, as a result, generates one or more control signals to lower the air temperature and dim the lighting. In some embodiments, exchange 102 specifies the particular zone of the user, in this case zone 203-3, as part of the generated message.

In some alternative embodiments, the controlling signal can also be based on one or more additional considerations such as the spatial closeness of the first telecommunications endpoint to the second telecommunications endpoint. For example, exchange 102 might generate a controlling signal to raise the temperature by three degrees on behalf of the user of endpoint 201-1 if the other endpoint involved is in another zone, but only by one degree if the other endpoint is within the same zone as endpoint 201-1.

The controlling signal, in some other alternative embodiments, can be based on not having received any content within any audio signal from one or more endpoints within a predetermined amount of time. For example, if endpoint 201-1 has not been used for a couple of hours, exchange 102 might assume that the user is no longer in the office and might lower the temperature a bit, in order to save energy. And as those who are skilled in the art will appreciate, different rules can be applied at different times throughout the day (e.g., the start of the workday, the end of the workday, the middle of the night, etc.).

At task 403, exchange 102 transmits the generated controlling signal to environmental control system 103 for the purpose of controlling the selected environmental condition or conditions.

Exchange 102 continually executes the already-described tasks during its operation, thereby controlling the environmental conditions within the geographic area in which the endpoints are situated.

The illustrative embodiment of the present invention features the management of environmental conditions. However, it will be clear to those skilled in the art, after reading this specification, how to make and use alternative embodiments of the present invention in which the data-processing system is able to manage other types of facilities, such as building security and employee safety systems. As one example of a non-environmental application, the system might detect, through one or more of endpoints 201-1 through 201-N, a human-generated sound that normally should not be present during a particular time of the night; in this case, it notifies building security that a possible intruder might be present. The system can perform detection of specific sounds, such as a loud scream, by accounting for audio characteristics such as timbre, pitch, volume, and so forth, and can take appropriate action based on the values of one or more of the characteristics. So, if the system determines that a signal sounds more like a burglar than a mouse, it can notify building security.

As another example of a non-environmental application, if the system detects, through one or more endpoints, a human-generated sound of a particularly troubling nature, such as cries for help outside of normal working hours, it notifies building safety that an employee might be in need of medical assistance.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, at a data-processing system, a first in-use signal from a first telecommunications endpoint that is part of a plurality of endpoints that are situated within a first geographic area and that are served by the data-processing system, the first in-use signal indicating that a user is using the first telecommunications endpoint, the data-processing system being capable of setting up a telephone call between the first telecommunications endpoint and a second telecommunications endpoint;
   receiving, at the data-processing system, a first audio signal from the first telecommunications endpoint, the first audio signal containing content uttered by the user of the first telecommunications endpoint;

generating a first control signal for changing a first environmental condition, the first control signal being based on the receiving of the first in-use signal, wherein the generation of the first control signal is also based on the content of the first audio signal; and generating a second control signal for changing the first environmental condition, wherein the second control signal is based on not having detected any content within any audio signal from the first telecommunications endpoint within a predetermined amount of time.

2. The method of claim 1 wherein the second control signal is also based on not having detected any content within any audio signal from any other telecommunications endpoint of the plurality of endpoints within the predetermined amount of time.

3. The method of claim 1 further comprising transmitting the first control signal to an environmental control system that serves the first geographic area.

4. The method of claim 3 wherein the first control signal specifies a first zone within the first geographic area, wherein the first telecommunications endpoint is situated within the first zone.

5. The method of claim 3 further comprising transmitting, to the first telecommunications endpoint, an indication that the first environmental condition is to be changed, wherein the indication is based on the generation of the first control signal.

6. The method of claim 1 wherein the first environmental condition is temperature.

7. The method of claim 1 wherein the first environmental condition is lighting.

8. A method comprising:
setting up, via a data-processing system, a telephone call between a first telecommunications endpoint and a second telecommunications endpoint, the first telecommunications endpoint being part of a plurality of endpoints that are situated within a first geographic area and that are served by the data-processing system;

receiving, at the data-processing system, a first in-use signal from the first telecommunications endpoint during the telephone call, the first in-use signal indicating that a user is using the first telecommunications endpoint;

receiving, at the data-processing system, a first audio signal from the first telecommunications endpoint, the first audio signal containing content uttered by the user of the first telecommunications endpoint;

generating a first control signal for changing a first environmental condition, the first control signal being based on the receiving of the first in-use signal, wherein the generation of the first control signal is also based on the content of the first audio signal; and generating a second control signal for changing the first environmental condition, wherein the second control signal is based on not having detected any content within any audio signal from any telecommunications endpoint of the plurality of endpoints within a predetermined amount of time.

9. The method of claim 8 further comprising transmitting the first control signal to an environmental control system that serves the first geographic area.

10. The method of claim 9 wherein the first control signal specifies a first zone within the first geographic area, wherein the first telecommunications endpoint is situated within the first zone.

11. The method of claim 9 further comprising transmitting, to the first telecommunications endpoint, an indication that the first environmental condition is to be changed, wherein the indication is based on the generation of the first control signal.

12. The method of claim 8 wherein the first environmental condition is temperature.

13. The method of claim 8 wherein the first environmental condition is lighting.

14. A method comprising:
setting up, via a data-processing system, a telephone call between a first telecommunications endpoint and a second telecommunications endpoint, the first and second telecommunications endpoints being part of a plurality of endpoints that are situated within a first geographic area and that are served by the data-processing system;

receiving, at the data-processing system, (i) a first in-use signal from the first telecommunications endpoint during the telephone call, the first in-use signal indicating that a first user is using the first telecommunications endpoint, and (ii) a second in-use signal from the second telecommunications endpoint during the telephone call, the second in-use signal indicating that a second user is using the second telecommunications endpoint; and generating a first control signal for changing a first environmental condition, the first control signal being based on the receiving of the first and second in-use signals.

15. The method of claim 14 further comprising:
receiving, at the data-processing system, a first audio signal from the first telecommunications endpoint, the first audio signal containing content uttered by the first user of the first telecommunications endpoint;

wherein the generation of the first control signal is also based on the content of the first audio signal.

16. The method of claim 15 further comprising generating a second control signal for changing the first environmental condition, wherein the second control signal is based on not having detected any content within any audio signal from any telecommunications endpoint of the plurality of endpoints within a predetermined amount of time.

17. The method of claim 14 further comprising transmitting the first control signal to an environmental control system that serves the first geographic area.

18. The method of claim 17 further comprising transmitting, to the first telecommunications endpoint, an indication that the first environmental condition is to be changed, wherein the indication is based on the generation of the first control signal.

19. The method of claim 14 wherein the first environmental condition is temperature.

20. The method of claim 14 wherein the first environmental condition is lighting.

* * * * *